United States Patent
Zeniya et al.

(10) Patent No.: US 10,835,830 B2
(45) Date of Patent: Nov. 17, 2020

(54) COMPUTER, CONTROL METHOD, NON-TRANSITORY COMPUTER-READABLE MEDIUM, AND TERMINAL DEVICE THAT EXECUTE PROGRESS OF A GAME

(71) Applicant: GREE, Inc., Minato-ku (JP)

(72) Inventors: Katsumi Zeniya, Minato-ku (JP); Kiyoto Nakamura, Minato-ku (JP)

(73) Assignee: GREE, Inc., Minato-ku (JP)

( * ) Notice: Subject to any disclaimer, the term of this patent is extended or adjusted under 35 U.S.C. 154(b) by 1 day.

(21) Appl. No.: 16/147,972

(22) Filed: Oct. 1, 2018

(65) Prior Publication Data

US 2019/0099682 A1    Apr. 4, 2019

(30) Foreign Application Priority Data

Sep. 29, 2017    (JP) .................. 2017-191198

(51) Int. Cl.
*A63F 13/95* (2014.01)
*A63F 13/77* (2014.01)

(52) U.S. Cl.
CPC .............. *A63F 13/95* (2014.09); *A63F 13/77* (2014.09)

(58) Field of Classification Search
CPC ................... A63F 13/95; A63F 13/77
See application file for complete search history.

(56) References Cited

U.S. PATENT DOCUMENTS

| | | |
|---|---|---|
| 2013/0116052 A1 | 5/2013 | Okada et al. |
| 2013/0310169 A1* | 11/2013 | Satsuma ............... A63F 13/35 463/30 |
| 2014/0200061 A1 | 7/2014 | Isa et al. |

FOREIGN PATENT DOCUMENTS

| | | |
|---|---|---|
| JP | 2014-121420 A | 7/2014 |
| JP | 2014-136001 A | 7/2014 |
| JP | 5841276 B1 | 1/2016 |
| JP | 2016-30188 A | 3/2016 |
| JP | 2016-41312 A | 3/2016 |

(Continued)

OTHER PUBLICATIONS

Japanese Office Action dated Aug. 13, 2019 in Patent Application No. 2017-191198 (with English translation), citing documents AO and AP therein, 6 pages.

(Continued)

*Primary Examiner* — Omkar A Deodhar
(74) *Attorney, Agent, or Firm* — Oblon, McClelland, Maier & Neustadt, L.L.P.

(57) ABSTRACT

A computer for executing progress of a game by using a game content, the computer including memory and circuitry, the memory configured to store information corresponding to each of a plurality of game contents classified into a plurality of groups associated with an attribute, the circuitry configured to select a first game content from among game contents belonging to a first group among the plurality of groups based on a selection instruction from a player, identify the attribute associated with the selected first game content, select a second game content from among game contents belonging to a second group of the plurality of groups based on the identified attribute, and associate a game content group at least including the selected first game content and the selected second game content with a player and stores the resultant game content group to the memory.

9 Claims, 10 Drawing Sheets

(56) References Cited

FOREIGN PATENT DOCUMENTS

| JP | 2016-67531 | A | 5/2016 |
|---|---|---|---|
| JP | 5926424 | B2 | 5/2016 |
| JP | 6096961 | B1 | 3/2017 |

OTHER PUBLICATIONS

Office Action dated Aug. 28, 2018 in Japanese Patent Application No. 2017-191198, citing documents AP-AR therein, 9 pages (with English language translation).

Japanese Office Action dated Jan. 15, 2019 in Japanese Patent Application No. 2017-191198 (with English translation), citing documents AO, AP, AU through AZ therein, 14 pages.

"[Kai-ri-sei Million Arthur] Which gacha should be drawn after the starter gacha?", [online], Dec. 24, 2015, [search made on Dec. 19, 2015],Retrieved from the Internet, URL: http://appmedia.jp/million-arthurs/113515, 6 pages (with partial English translation).

"[Added on Aug. 15] Update on the starter gacha!", [online], Aug. 15, 2017, [search made on Dec. 19, 2018], Retrieved from the Internet, URL: https://www.kairisei-ma.jp/information/2017/08/17082000starter.html, pp. 1-3 (with partial English translation).

"[Social game terms] mixer gacha", [online], Sep. 14, 2015, [search made on Dec. 19, 2018], Retrieved from the Internet, URL: https://www.entame.work/mixer_gacha/ , pp. 1-3 (with partial English translation).

"Happy Happy Winged!", [online], Aug. 15, 2017, [search made on Dec. 19, 2018], Retrieved from the Internet, URL: http://www.atgames.ip/atgames/html/campaign_event/2017/08/20170801_gachaEV.html, pp. 1-4 (with partial English translation).

"<Puzzle & Dragons> The update to be released on Jul. 13 includes implementation of a "trade" feature that enables to trade a monster with a friend. How to use the feature is also revealed.", [online], Jul. 11, 2017[search made on Dec. 19, 2018], Retrieved from the Internet, URL: https://www.4gamer.net/games/148/G0141877/20170711054/, pp. 1-4 (with partial English translation).

"Selfy Town Summer Special Campaign Part 1: A set of costumes of your choice offered for free!", [online], Jul. 15, 2010, [search made on Dec. 19, 2010], Retrieved from the Internet, URL: https://www.gungho.ip/index.php?module=Page&action=NoticeDetailPage&notice_id=2027>, pp. 1-3 (with partial English translation).

* cited by examiner

FIG. 6

GAME CONTENT TABLE T1

| GAME CONTENT ID | NAME | IMAGE | CATEGORY | GENRE | GENDER | COLOR | DEGREE OF RARITY | ... |
|---|---|---|---|---|---|---|---|---|
| C0001 | ×× | 0001.png | CLOTHES | NEAT AND CLEAN GIRL | FEMALE | YELLOW | SS | ... |
| C0002 | ++ | 0002.png | CLOTHES | SEXY GIRL | FEMALE | RED | R | ... |
| ... | ... | ... | ... | ... | ... | ... | ... | ... |
| C1001 | ○○ | 1001.png | HAIR | NEAT AND CLEAN GIRL, DRESSY GIRL | FEMALE | YELLOW, WHITE | R | ... |
| C1002 | ▽▽ | 1002.png | HAIR | SEXY GIRL, LITTLE DEVIL GIRL | FEMALE | RED | R | ... |
| ... | ... | ... | ... | ... | ... | ... | ... | ... |
| C2001 | □□ | 2001.png | ACCESSORIES | NEAT AND CLEAN GIRL, DRESSY GIRL | FEMALE | WHITE | R | ... |
| C2002 | △△ | 2002.png | ACCESSORIES | SEXY GIRL | FEMALE | YELLOW | SS | ... |
| ... | ... | ... | ... | ... | ... | ... | ... | ... |
| C3001 | □□ | 3001.png | BACKGROUND | NEAT AND CLEAN GIRL, DRESSY GIRL, LITTLE DEVIL GIRL | FEMALE | YELLOW, WHITE, RED, BEIGE | R | ... |
| C3002 | △△ | 3002.png | BACKGROUND | SEXY GIRL, LITTLE DEVIL GIRL | FEMALE | RED | SS | ... |
| ... | ... | ... | ... | ... | ... | ... | ... | ... |

FIG. 7A

EVENT TABLE T2

| EVENT ID | EVENT PERIOD | SELECTION GAME OBJECT | ... |
|---|---|---|---|
| EV001 | 20170721-00:00 ~ 20170722-23:59 | C0001, 0002, 0003, 0004, 0008, 0009, ... | ... |
| ... | ... | ... | ... |

FIG. 7B

PLAYER TABLE T3

| PLAYER ID | NAME | MAIN GAME CONTENT (OWNER ID, GAME CONTENT ID) | OWNING GAME CONTENT (OWNER ID, GAME CONTENT ID) | FRIEND PLAYER | ... |
|---|---|---|---|---|---|
| p0000001 | ○○○○ | (HA001, A0001), (HA002, A0021), (HA003, A0035), ... | (HC001, C0001), (HC002, C0021), (HC003, C0035), ... | p0000002, p0000021, ... | ... |
| p0000002 | △△△△ | (HA001, A0002), (HA002, A0005), (HA003, A0020), ... | (HC001, C0002), (HC002, C0005), (HC003, C0020), ... | p0000001, p0000013, ... | ... |
| ... | ... | ... | ... | ... | ... |

COMPUTER, CONTROL METHOD, NON-TRANSITORY COMPUTER-READABLE MEDIUM, AND TERMINAL DEVICE THAT EXECUTE PROGRESS OF A GAME

CROSS-REFERENCE TO RELATED APPLICATIONS

This application is based upon and claims the benefit of priority of prior Japanese Patent Application No. 2017-191198, filed on Sep. 29, 2017, the entire contents of which are incorporated herein by reference.

FIELD

Embodiments discussed in the present specification relates to a computer, a control method, a non-transitory computer-readable medium, and a terminal device.

BACKGROUND

Conventionally, a game system that gives a game content to a player as a prize, a reward etc. according to the operation by the player is known. In such a game system, there is a case where a plurality of game contents is given to a player based on a game specification, a game rule etc.

For example, Japanese Laid Open Patent Publication No. 2014-121420 discloses a game system that executes a game in which a plurality of type of game contents are given to a user when a predetermined condition is satisfied. In this game system, when a user logs in to a game according to the login operation by a user, a present bag is given to a user. The game system gives the same number of presents as the number of present bags owned by the user according to the acquisition operation by the user.

SUMMARY

In such a game system, each of a plurality of game contents provided to the player has different colors, designs, categories etc. For this reason, since the player may not predict what type of game content will be given, the user's interest in the game can be enhanced. However, when there is no sense of uniformity in colors, the designs, the categories etc. of a plurality of game contents given to the player, the motivation of a player who intends to continuously play the game may be reduced.

The purpose of the disclosed computer, control method, non-transitory computer-readable, and terminal device is to solve such a problem and an object of the disclosed computer, control method, non-transitory computer-readable, and terminal device is to improve the motivation of the player to continuously play the game in which a plurality of game contents may be associated with the player and to increase the number of participants to the game.

According to an aspect of a computer, there is provided a computer for executing progress of a game by using a game content, the computer including memory and circuitry, the memory configured to store information corresponding to each of a plurality of game contents classified into a plurality of groups associated with an attribute, the circuitry configured to select a first game content from among game contents belonging to a first group among the plurality of groups based on a selection instruction from a player, identify the attribute associated with the selected first game content, select a second game content from among game contents belonging to a second group of the plurality of groups based on the identified attribute, and associate a game content group at least including the selected first game content and the selected second game content with a player and stores the resultant game content group to the memory.

According to an aspect of the computer, the circuitry is configured to receive an instruction corresponding to an exchange game content from a player with respect to the game content group, select a reselection game content from among other game contents belonging to a group to which the exchange game content belongs, and exchange the reselection game content for the exchange game content.

According to an aspect of the computer, the memory is configured to store information indicating whether players include a predetermined relationship, the circuitry is configured to receive an instruction corresponding to the exchange game content with respect to the game content group of each of a first player and a second player from each of the first player and the second player, and exchange an exchange game content specified by the first player for an exchange game content specified by the second player.

According to an aspect of the computer, the circuitry is configured to exchange the exchange game content for a predetermined period from when the game content group is associated with the player and the game content group associated with the player is stored in the memory.

According to an aspect of the computer, the memory is configured to store an avatar indicating a player in various services provided by the computer, and the plurality of game contents includes an item attached to the avatar.

According to an aspect of the computer, the circuitry is configured to output an image of the avatar attached with the item included in the game content group.

According to an aspect of a control method, there is provided a control method for controlling a computer for executing progress of a game by using a game content, the computer including a memory, the control method includes storing, in the memory, information corresponding to each of a plurality of game contents classified into a plurality of groups associated with an attribute, selecting a first game content from among game contents belonging to a first group among a plurality of groups based on a selection instruction from a player, identifying an attribute associated with the selected first game content, selecting a second game content from among game contents belonging to a second group of the plurality of groups based on the identified attribute, and associating a game content group at least including the selected first game content and the selected second game content with a player and storing the resultant game content group to the memory.

According to an aspect of a non-transitory computer-readable medium, there is a non-transitory computer-readable medium including computer program instructions, when executed by a computer for executing progress of a game by using a game content, the computer including a memory, the computer program instructions causing the computer to store, in the memory, information corresponding to each of a plurality of game contents classified into a plurality of groups associated with an attribute, select a first game content from among game contents belonging to a first group among a plurality of groups based on a selection instruction from a player, identify an attribute associated with the selected first game content, select a second game content from among game contents belonging to a second group of the plurality of groups based on the identified attribute, and associate a game content group at least including the selected first game content and the selected second game content with a player and store the resultant game content group to the memory.

According to an aspect of a terminal device, there is a terminal device for executing progress of a game by using a game content, the terminal device includes memory and circuitry, the memory configured to store information corresponding to each of a plurality of game contents classified into a plurality of groups associated with an attribute, the circuitry configured to select a first game content from among game contents belonging to a first group among the plurality of groups based on a selection instruction from a player, identify the attribute associated with the selected first game content, select a second game content from among game contents belonging to a second group of the plurality of groups based on the identified attribute, and associate a game content group at least including the selected first game content and the selected second game content with a player and stores the resultant game content group to the memory.

With the computer, the control method, the non-transitory computer-readable, and the terminal device, it is possible to improve the motivation of the player to continuously play the game in which a plurality of game contents may be associated with the player and to increase the number of participants to the game.

BRIEF DESCRIPTION OF DRAWINGS

Other features and advantages of the present invention will be apparent from the ensuing description, taken in conjunction with the accompanying drawings, in which:

FIG. 6 is a diagram illustrating one example of a data structure of a game content table T1.

FIG. 7A is a diagram illustrating one example of a data structure of an event table T2 and FIG. 7B is a diagram illustrating one example of a data structure of a player table T3.

DESCRIPTION OF EMBODIMENTS

With reference to the drawings, various embodiments of the present invention are described below. However, the technical scope of the present invention is not limited to these embodiments, but extends to the invention recited in CLAIMS and equivalents thereof.

Figure 1:
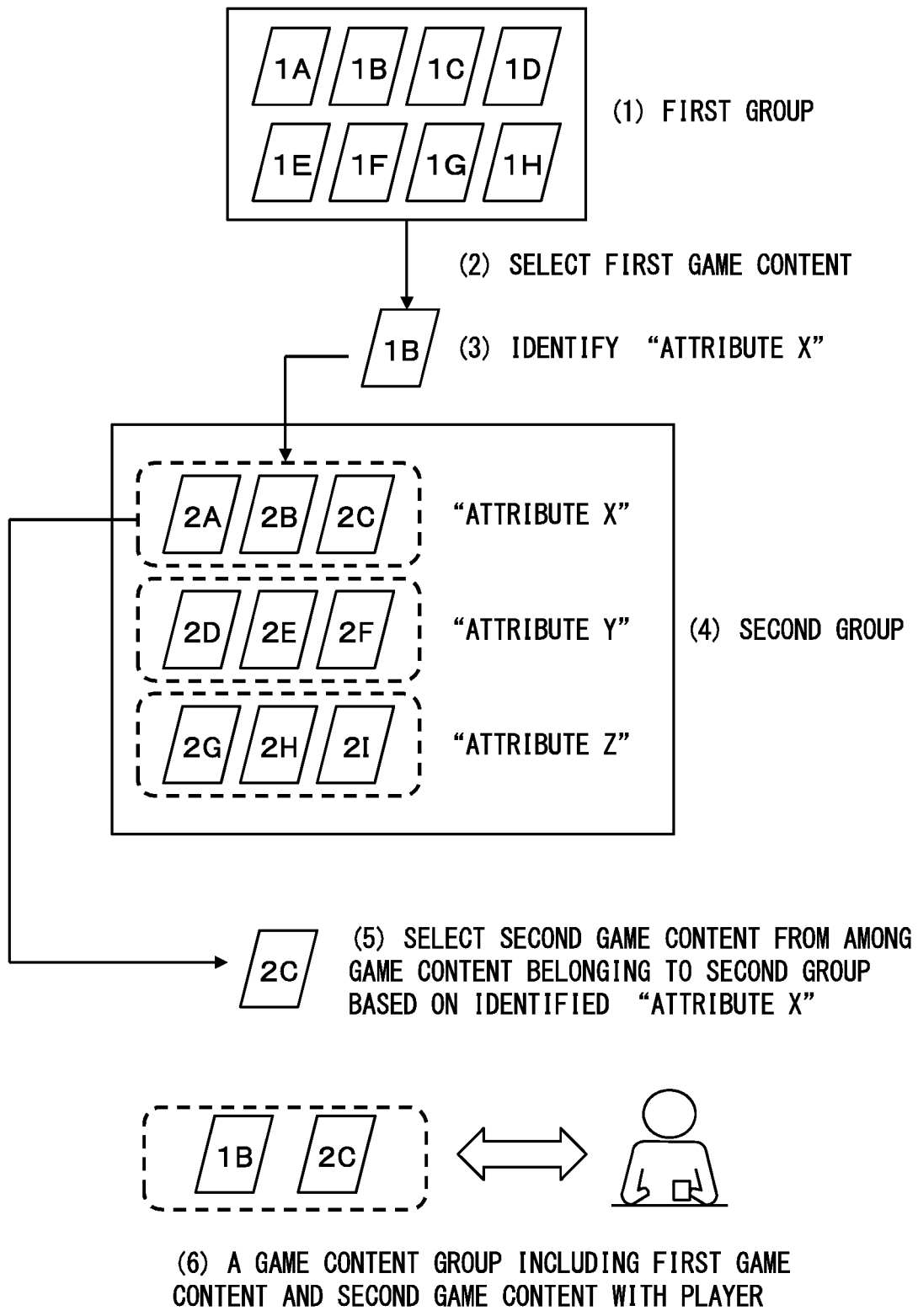
FIG. 1 is a schematic diagram for illustrating one example of a selection game provided by a game device.

FIG. 1 is a schematic diagram for illustrating one example of the selection game provided by the game system. The game system includes a mobile terminal owned by the player and the server that communicates with the mobile terminal owned by the player. The server is an example of a computer.

In the present embodiment, the server stores a plurality of game contents. The game content is electronic data used in various games, various services etc. provided by the game system, and is, for example, a game content related to an avatar indicating the player. The game contents related to the avatar are item data such as clothes or accessories to be attached to the avatar, avatar outline data configuring each part (eyes, nose, mouth, etc.) of the avatar's face and/or the avatar's hair, and background data configuring a background of the avatar.

The game content may be a card, a character, a point, a virtual currency, a ticket, a parameter etc. The game content may be parameters such as level information, status information, ability information such as a physical strength value and offensive power, a skill, and an ability. The game content may be a spell, a job etc. The game content may be any data as long as it is electronic data that can be acquired, held, used, managed, exchanged, synthesized, reinforced, sold, discarded, and/or donated by the player in the game. In addition, a use aspect of the game content is not limited to that specified in this specification.

The server associates the attribute with each of a plurality of game contents and stores the attribute associated with each game content. The attribute is data indicating an appearance, a performance etc. of the game content. When the game content is related to the avatar, the attribute is, for example, the colors, the category (neat and clean girl, little devil girl, etc.) etc. The attribute may be data indicating properties of a flame, thunder, etc. The attribute may be any data as long as it is data associated with the game content based on the game.

The server classifies each of a plurality of game contents into a plurality of groups and stores the classified game contents. For example, the server associates each of a plurality of game contents with the information corresponding to categories and stores the associated game contents. As a result, each of a plurality of game contents is stored so as to belong to any of the groups corresponding to each category. When the game content is related to the avatar, the categories are, for example, clothes, accessories, hair, face, background, etc.

The server may classify each of a plurality of game contents into a plurality of groups and store the classified game contents based on the attribute associated with each of the game contents. For example, the server stores the game contents by assuming that the game content associated with the same attribute belongs to one group. In this case, groups whose numbers correspond to the number of the attributes are generated.

With reference to FIG. 1, one example of the selection game provided by the game system having the server for storing a plurality of game contents is described below.

The server presents the game content belonging to the first group among a plurality of groups to a player in a selectable manner. In an example illustrated in (1) of FIG. 1, the game contents 1A to 1H belonging to the first group are presented for the player in a selectable manner.

When a desired game content is specified by a player from among the presented game contents, a selection instruction including information corresponding to the specified game content is input. When the player inputs the selection instruction, based on the selection instruction, the server selects the first game content from among the game contents belonging to the first group. In an example illustrated in (2)

of FIG. 1, based on the selection instruction by the player, from among the game contents 1A to 1H belonging to the first group, the game content 1B is selected as the first game content.

Next, the server identifies the attribute associated with the selected first game content. In an example illustrated in (3) of FIG. 1, an "attribute X" associated with the selected first game content 1B is identified.

Next, based on the identified attribute, the server selects the second game content from among the game contents belonging to the second group of a plurality of groups. In an example illustrated in (4) of FIG. 1, the server stores the game contents 2A to 2I belonging to the second group. The game contents 2A to 2C are associated with an "attribute X," game contents 2D to 2F are associated with an "attribute Y," and game contents 2G to 2I are associated with an "attribute Z."

As illustrated in (5) of FIG. 1, from among the game contents 2A to 2I belonging to the second group, the server extracts the game contents 2A to 2C associated with the "attribute X" identified in (3) of FIG. 1. Next, from among the extracted game contents 2A to 2C, the server selects the game content 2C as the second game content.

The server associates a game content group including at least the selected first game content and the selected second game content with a player and stores the game content group associated with the player. In an example illustrated in (6) of FIG. 1, a game content group including the first game content 1B and the second game content 1C is associated with the player who inputs the selection instruction and the game content group associated with the player is stored.

As described above with reference to FIG. 1, in the game system according to the present embodiment, the game content group associated with the player includes the game content associated with the same attribute. For example, when the attribute is the data indicating the appearance of the game content, the server can associate the game content group that has the unified sense of the color and the design of the game content with the player. For example, when the attribute is the data indicating the category of the game content, the server can associate the game content group including the unified category of the game content to the player. In this way, by the game system according to the present embodiment, it is possible to improve the motivation of the player to continue the game with respect to the game that relates a plurality of game contents to the player and increase the number of participants to the game. Further, in the game system according to the present embodiment, when the number of the second game content associated with the attribute is more than one, by a single selection instruction, a plurality of second game contents are simultaneously associated with the player. As a result, compared with the game system in which the selection game is executed for each of a plurality of second game contents, the number of executions of the game execution process is reduced and the amount of data for displaying the user interface screen is also reduced. Accordingly, by the game system according to the present embodiment, the load of the processing for progressing the selection game can be reduced. Further, by the game system according to the present embodiment, it is possible to provide the user interface that does not demand the player to conduct a plurality of operations and can be easily operated by any player.

The above description of FIG. 1 is merely an explanation for understanding the contents of the present invention. Specifically, the present invention may be carried out in each of the embodiments described below and may be implemented by various variations substantially without exceeding the principle of the present invention. All such variations are included in the present invention and the scope of disclosure of this specification.

Figure 2:
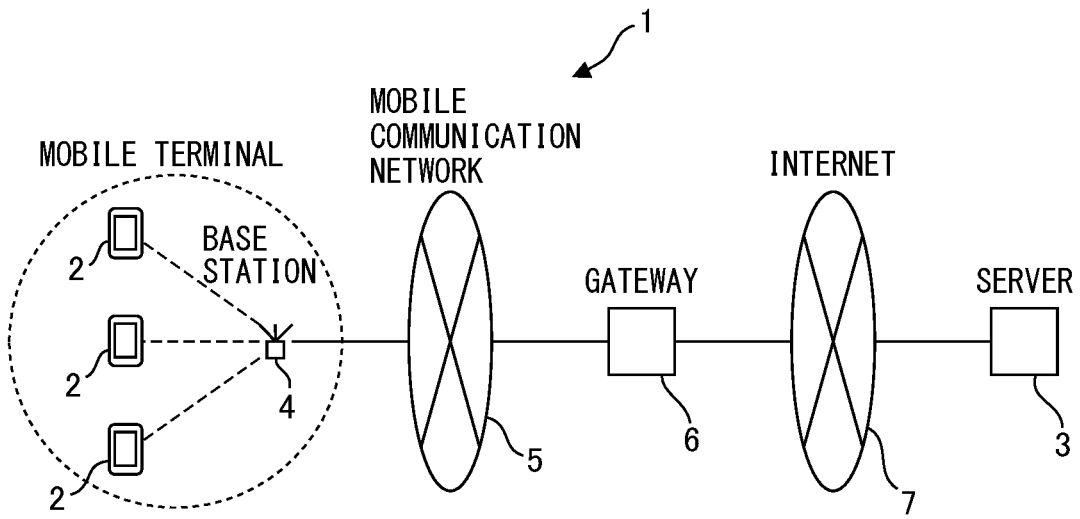
FIG. 2 is a diagram illustrating one example of a schematic configuration of a game system 1.

FIG. 2 is a diagram illustrating one example of the schematic configuration of the game system 1.

The game system 1 includes a plurality of mobile terminals 2 operated by each of a plurality of players and the server 3. The mobile terminal 2 and the server 3 are connected with each other via a communication network such as a base station 4, a mobile communication network 5, a gateway 6, and the Internet 7. The communication is conducted between the mobile terminal 2 and the server 3 based on a predetermined communication protocol. The predetermined communication protocol is, for example, an HTTP (Hypertext Transfer Protocol) etc. Although the mobile terminal 2 is one example of the game device that provides the game, the game device is not limited to the mobile terminal 2. For example, the server 3 may be used as the game device. Further, the game system 1 including the mobile terminal 2 and the server 3 may be used as the game device.

The mobile terminal 2 is a terminal device such as a multi-function mobile phone (so-called "smart phone"). The mobile terminal 2 may be, for example, a mobile phone (so-called "feature phone"), a PDA (Personal Digital Assistant), a tablet terminal, a tablet PC (Personal Computer) etc. Further, the mobile terminal 2 may be a portable game machine, a portable music player, a notebook PC etc.

Figure 3:
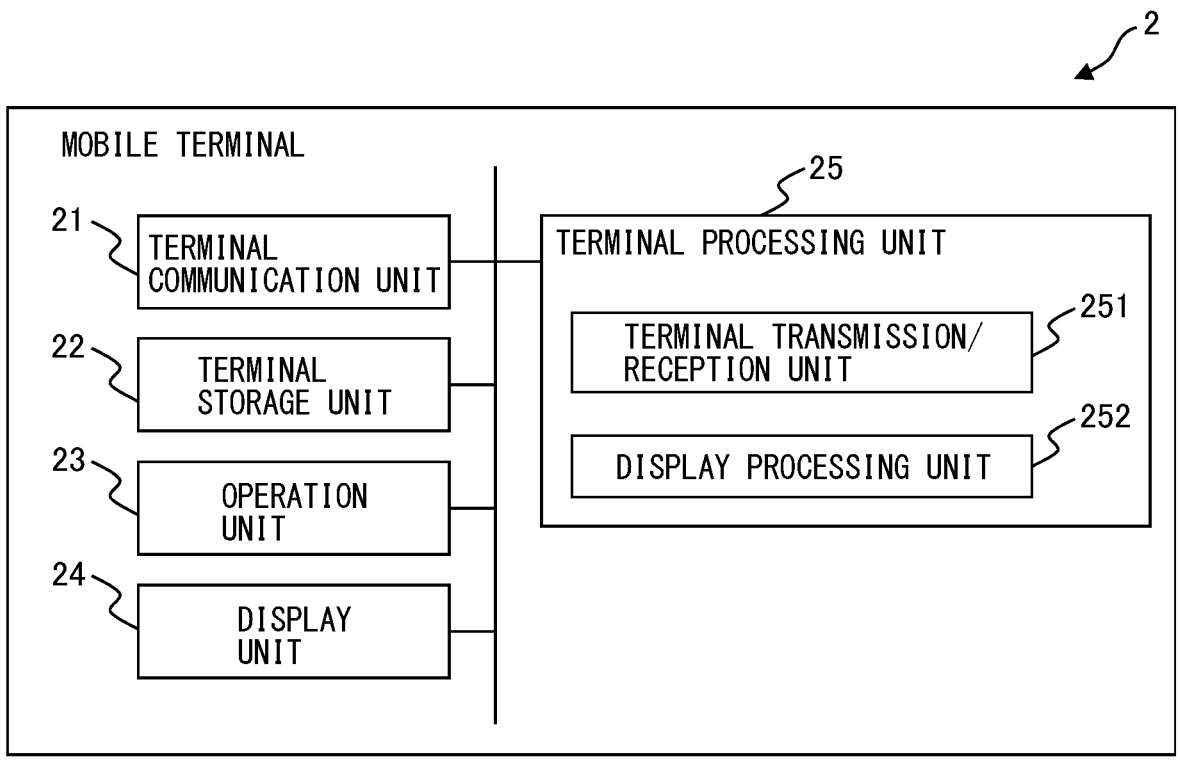
FIG. 3 is a diagram illustrating one example of a schematic configuration of a mobile terminal 2.

FIG. 3 is a diagram illustrating one example of the schematic configuration of the mobile terminal 2.

The mobile terminal 2 is connected with the server 3 via the base station 4, the mobile communication network 5, the gateway 6, and the Internet 7 and conducts the communication with the server 3. The mobile terminal 2 controls the game progress based on various instructions input by the player. The mobile terminal 2 receives various pieces of data from the server 3 and displays game progress screens etc. The mobile terminal 2 includes a terminal communication unit 21, a terminal storage unit 22, an operation unit 23, a display unit 24, and a terminal processing unit 25.

The terminal communication unit 21 includes a communication interface circuit that includes an antenna having a predetermined frequency band as a sensitive band and connects the mobile terminal 2 with the communication network. The terminal communication unit 21, via a channel allocated by the base station 4, establishes a radio signal line with the base station 4 by a CDMA (Code Division Multiple Access) scheme and conducts the communication with the base station 4. The terminal communication unit 21 transmits the data supplied from the terminal processing unit 25 to the server 3. The terminal communication unit 21 supplies the data received from the server 3 etc. to the terminal processing unit 25.

The terminal storage unit 22 includes, for example, a semiconductor memory device such as a ROM (Read Only Memory) and a RAM (Random Access Memory). The terminal storage unit 22 stores an operating system program, a driver program, an application program, the data etc. used for the processing in the terminal processing unit 25. The driver program stored in the terminal storage unit 22 is an input device driver program for controlling the operation unit 23, an output device driver program for controlling the display unit 24 etc. The application program stored in the terminal storage unit 22 is a control program etc. for controlling the game progress. The data stored in the terminal storage unit 22 is various pieces of data used in the game execution (for example, image etc. of avatar indicating player), identification information for identifying the player participating in the selection game etc. Further, the terminal storage unit 22 may temporarily store the temporary data related to the predetermined processing.

The operation unit 23 is a pointing device such as a touch panel. The operation unit 23 may be an input key etc. By using the operation unit 23, the player can input characters, numerals, symbols, a position on the display screens of the display unit 24 etc. When the operation unit 23 is operated by the player, the operation unit 23 generates the signal corresponding to the operation. The generated signal is supplied to the terminal processing unit 25 as the instruction of the player.

The display unit 24 is a liquid crystal display. The display unit 24 may be an organic EL (Electro-Luminescence) display etc. The display unit 24 displays the video corresponding to the video data supplied from the terminal processing unit 25 and the image corresponding to the image data.

The terminal processing unit 25 includes one or a plurality of processors and peripheral circuits thereof. The terminal processing unit 25 is circuitry centrally controlling the overall operation of the mobile terminal 2 and is, for example the CPU (Central Processing Unit). The terminal processing unit 25, based on the program stored in the terminal storage unit 22 and various instructions etc. inputted according to the operation of the operation unit 23 by the player, executes various information processes in an appropriate procedure and controls the operation of the terminal communication unit 21 or the display unit 24. The terminal processing unit 25 executes various information processes based on the operating system program, the driver programs, and the application program stored in the terminal storage unit 22. The terminal processing unit 25 can executes a plurality of programs in parallel.

The terminal processing unit 25 includes at least a terminal transmission/reception unit 251 and a display processing unit 252. Each of these units is a functional module realized by the program executed by the processors included in the terminal processing unit 25. Alternatively, each of these units may be mounted on the mobile terminal 2 as the firmware.

Figure 4A:
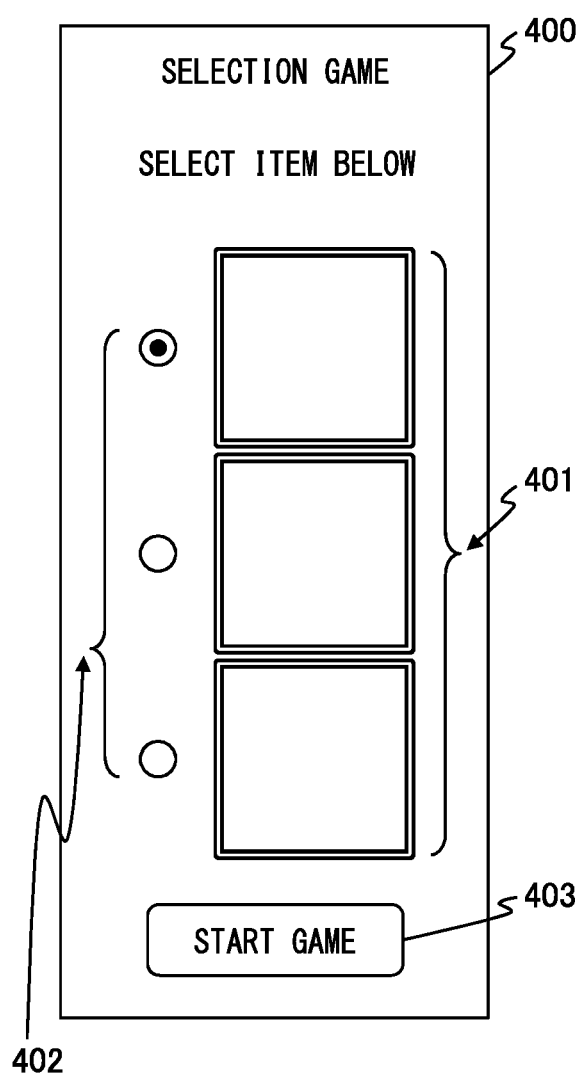
FIG. 4A and FIG. 4B are diagrams illustrating one example of screens displayed on the mobile terminal 2.
Figure 4B:
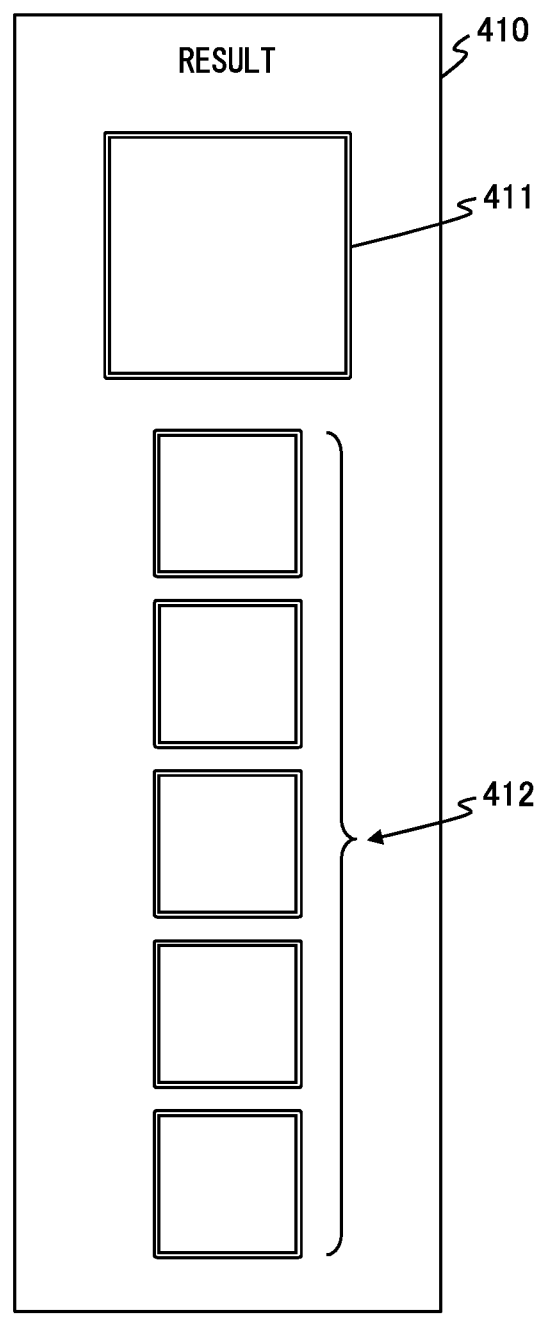

With reference to FIG. 4A and FIG. 4B, one example of various screens displayed on the display unit 24 of the mobile terminal 2 is described below.

FIG. 4A is a diagrams illustrating one example of a game start screen 400 displayed on the display unit 24 of the mobile terminal 2.

The game start screen 400 is displayed, when for example, the control program for executing the selection game in the present embodiment is activated. The game start screen 400 includes a candidate game content 401, a selection object 402, and a game start object 403.

The candidate game content 401 is an image representing each of a plurality of game contents belonging to the same category. The game content indicated by the candidate game content 401 is one example of the game contents belonging to the first group.

The game start screen 400 is not limited to include three candidate game contents 401. The game start screen 400 may include the candidate game content 401 indicating each of all of the game contents belonging to the first group. The game start screen 400 may include the candidate game content 401 indicating each of a part of the game contents of the game contents belonging to the first group.

In this case, a part of the game content from among the game contents belonging to the first group may be a game content that is extracted from the game contents belonging to the first group and satisfies a predetermined display condition. The predetermined display condition is, for example, a condition in which the degree of rarity of the game content is equal to or higher than the predetermined degree of rarity, a condition in which the attribute of the game content is a predetermined attribute, etc. The number of the candidate game contents 401 displayed on the game start screen 400 may be the number corresponding to the number of times the player participates in the selection game. For example, as the number of times of the player participates in the selection game is larger, the number of the candidate game contents 401 may be set to be larger. In this case, the player can select more candidate game contents 401 on the game start screen 400 by participating in the selection game more and it is possible to improve the player's motivation to continue the selection game. For example, as the number of times the player participates in the selection game is small, the number of the candidate game content 401 may be set to be larger. In this case, through the game start screen 400, an inexperienced player or a novice player can select more candidate game contents 401 and it is possible to increase the number of players who participate in the selection game.

The selection object 402 is a selected object for selecting a single game content from the candidate game contents 401 and is, for example, a check button. Each of the selection objects 402 corresponds one-to-one with each of the candidate game contents 401. When the input position on the game start screen 400 input according to the operation of the operation unit 23 by the player is within any one of the display areas of the selection object 402, the selection object 402 corresponding to the display area is changed to the display indicating the selection by the player. In this way, when the player conducts the operation to select one of the selection objects 402, the selected selection object 402 is distinguishably displayed from other selection objects 402 that are not selected.

The game start object 403 is a button object for instructing the selection game execution. The game start object 403 may be an icon image, text, etc. When the input position on the game start screen 400 input according to the operation of the operation unit 23 by the player is within the display area of the game start object 403, the selection instruction is input to the mobile terminal 2. In this way, when the player conducts the operation of selecting the game start object 403, the selection instruction is input to the mobile terminal 2. When the player inputs the selection instruction, the selection game is executed and a result screen 410 described later is displayed on the display unit 24.

The selection instructions include identification information for identifying the player who conducts the operation of selecting the game start object 403 and identification information for identifying the candidate game content 401 corresponding to the selection object 402 selected by the player.

FIG. 4B is a drawing illustrating one example of a result screen 410 displayed on the display unit 24 of the mobile terminal 2.

The result screen 410 is displayed for example when the selection game according to the present embodiment is conducted. The result screen 410 includes a first result image 411 and a second result image group 412.

The first result image 411 is an image indicating the avatar attached with and/or reflected with a part or all of the game contents included in the game content group associated with the player by the selection game execution. The avatar indicated by the first result image 411 is an avatar indicating the player who conducts the selection game or an avatar associated with the player who conducts the selection game. The game content attached to the avatar is, for example, item data such as clothes or accessories and avatar outline data configuring the avatar's hair or the avatar's face parts (eyes, nose, mouth, etc.). The game content reflected on the avatar is, for example, background data, etc., configuring the background of the avatar. When the game content group associated with the player by the selection game execution does not include the game content related to the avatar, the first result image 411 is not included in the result screen 410.

The second result image group 412 is an image indicating a part or all of the game contents included in the game content group associated with the player by the selection game execution.

Figure 5:
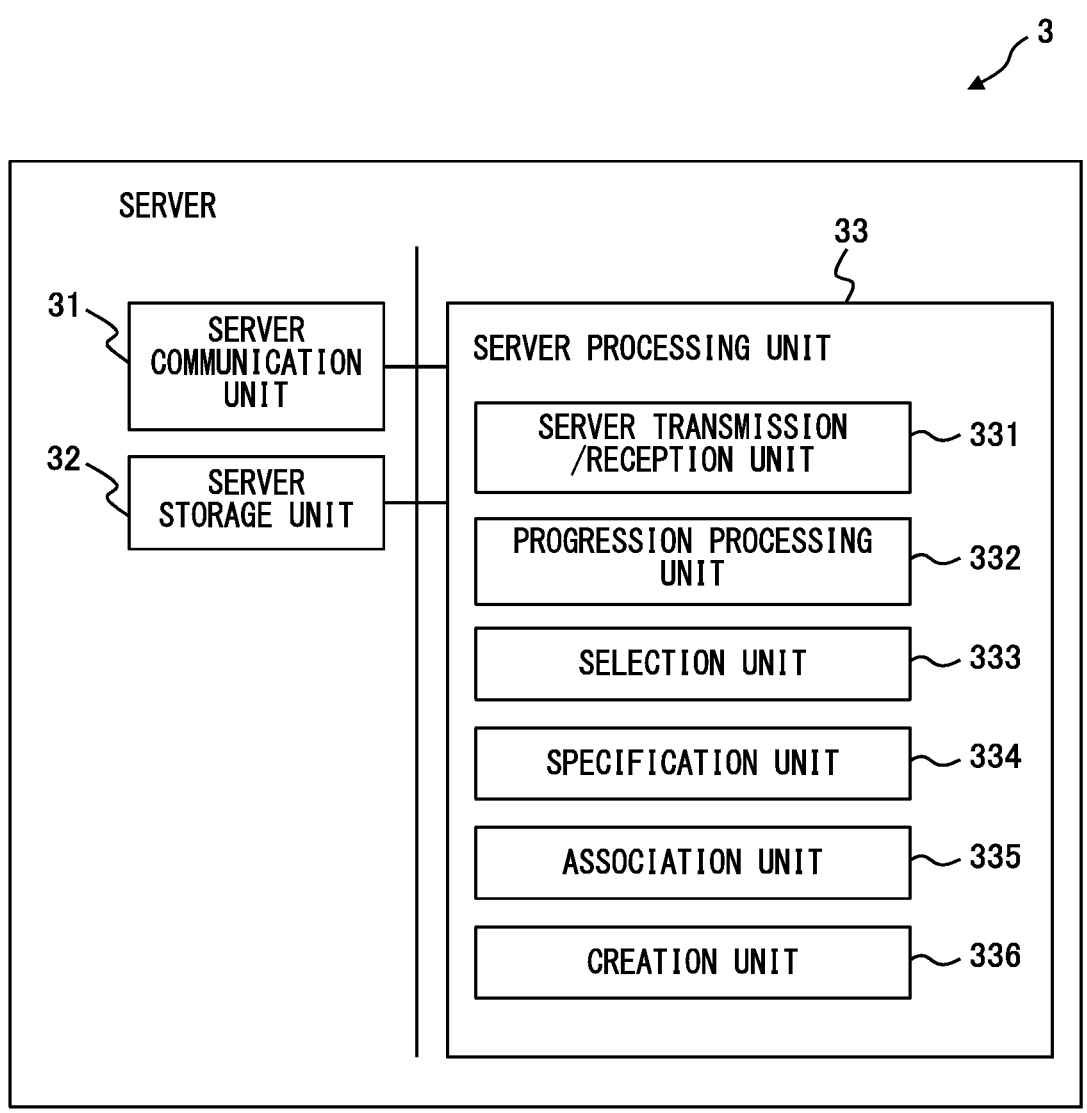
FIG. 5 is a diagram illustrating one example of a schematic configuration of a server 3.

FIG. 5 is a diagram illustrating one example of a schematic configuration of the server 3.

The server 3 executes the selection game based on the instruction from the mobile terminal 2. The server 3 creates display data etc. of the screens related to the selection game and transmits the data to the mobile terminal 2. Therefore, the server 3 includes a server communication unit 31, a server storage unit 32, and a server processing unit 33.

The server communication unit 31 includes a communication interface circuit for connecting the server 3 with the Internet 7 and conducts the communication with the Internet 7. The server communication unit 31 supplies the data received from the mobile terminal 2, etc., to the server processing unit 33 and transmits the data supplied from the server processing unit 33 to the mobile terminal 2, etc.

The server storage unit 32 includes, for example, at least one of a magnetic tape device, a magnetic disk device, or an optical disk device. The server storage unit 32 stores the operating system program, the driver programs, the application program, the data, etc., used for the processing in the server processing unit 33. The application program stored in the server storage unit 32 is a game program, etc., for executing the selection game for each mobile terminal 2 based on various instructions from each of the mobile terminals 2 and creating display data for displaying on various screens. The computer program stored in the server storage unit 32 may be installed in the terminal storage unit 22 from a computer-readable portable recording medium such as a CD-ROM and a DVD-ROM using a known setup program, etc.

The pieces of data stored in the server storage unit 32 are the game content table T1, the event table T2, the player table T3, etc. The server storage unit 32 stores various pieces of image data relating to the selection game progress (for example, image data indicating game content). Further, the server storage unit 32 may temporarily store the temporary data relating to the predetermined processing. In other words, the server storage unit 32 may include a RAM (Random Access Memory) and store the dynamic data fluctuating based on the game progress.

With reference to FIG. 6, FIG. 7A and FIG. 7B, one example of the data structure of various tables stored by the server storage unit 32 is described below.

FIG. 6 illustrates the game content table T1 that manages the game content. In the game content table T1, the game content ID (identification), the name, the image, the categories, the category, the gender, the colors, the degree of rarity, etc., of each game content are stored in association with one another. The category, the gender, and the color are one example of the attribute.

The game content ID is an example of the identification information for uniquely identifying each game content. In the image, the file name of the image indicating the game content is stored.

In the degree of rarity, information indicating, for example, the normal, the rare, the S (super) rare, the SS (double super) rare, the SSS (triple super) rare, the legend etc. is stored.

FIG. 7A illustrates the event table T2 for managing the event. In the event table T2, for each event, the event ID of the event, the event period, the selection game object, etc., are stored in association with one another.

The event ID is an example of identification information for uniquely identifying each event. The event period is a period during which the selection instruction for executing the selection game can be received. In the selection game object, the game content ID of the game content to be selected in the selection game is stored.

FIG. 7B illustrates the player table T3 for managing the player. In the player table T3, for each player, the player ID of each player, the name of each player, the main game content, the owning game content, the friend player, etc., are stored in association with one another.

The player ID is an example of the identification information for uniquely identifying each player. The game content ID indicating the avatar owned by the player is associated with the owner ID and the game content ID associated with the owner ID is stored in the main game content. The server storage unit 32 stores the image indicating the avatar in association with the game content ID indicating the avatar. The owning game content stores the game content ID of the game content owned by the player in association with the owner ID. Further, the owning game content may include each game content ID and the date and time when each game content is associated with the player (when each game content ID is associated with the owner ID). The owning game content is an example of each game content of the game content group.

The friend player stores the player ID of another player who is a friend with the player. The friend relationship is an example of a predetermined relationship. The predetermined relationship is not limited to the friend relationship and may be any relationship among the players on the game (hostile relationship, cooperative relationship, etc.).

Returning to FIG. 5, the server processing unit 33 at least includes a server transmission/reception unit 331, a progression processing unit 332, a selection unit 333, a specification unit 334, an association unit 335, and a creation unit 336. Each of these units is a functional module implemented by the program executed by the processors (circuitry) included in the server processing unit 33. Alternatively, each of these units may be mounted on the server 3 as the firmware.

The terminal processing unit 25 of the mobile terminal 2 and the server processing unit 33 of the server 3 are described below. First, each of the terminal transmission/reception unit 251 and the display processing unit 252 of the terminal processing unit 25 of the mobile terminal 2 is described.

The terminal transmission/reception unit 251 transmits the selection instruction input according to the operation of the operation unit 23 by the player to the server 3 via the terminal communication unit 21. The terminal transmission/reception unit 251 includes the identification information for identifying the player stored in the terminal storage unit (for example, player ID) in the selection instruction and transmits the resultant selection instruction. The terminal transmission/reception unit 251 receives the display data from the server 3 via the terminal communication unit 21 and transfers the received display data to the display processing unit 252.

The display processing unit 252 displays the game start screen 400 on the display unit 24. The game start screen 400 is displayed when, for example, the control program for executing the selection game in the present embodiment according to the operation of the operation unit 23 by the player is activated.

The display processing unit 252 acquires the display data received by the terminal transmission/reception unit 251 from the terminal transmission/reception unit 251 and based on the acquired display data, displays various screens such as the result screen 410 on the display unit 24.

Next, each of the server transmission/reception unit 331, the progression processing unit 332, the selection unit 333, the specification unit 334, the association unit 335, and the creation unit 336 of the server processing unit 33 of the server 3 is described.

The server transmission/reception unit 331 receives the selection instruction from the mobile terminal 2 via the server communication unit 31. Further, the server transmission/reception unit 331 transmits the display data for displaying various screens such as result screen created by the game progress processing to the mobile terminal 2 via the server communication unit 31.

The progression processing unit 332 acquires the selection instruction received by the server transmission/reception unit 331 and transfers the acquired selection instruction to the selection unit 333.

The selection unit 333 acquires the selection instruction from the progression processing unit 332. Next, the selection unit 333 identifies the identification information for identifying the game content included in the acquired selection instruction (for example, game content ID). The selection unit 333 selects the game content ID stored in the game content table T1 based on the identified identification information. For example, when the identification information for identifying the game content is the game content ID, the selection unit 333 selects the same game content ID as the identified identification information (game content ID) from among the game content IDs stored in the game content table T1. The same game content ID as the identified identification information (game content ID) is one example of the game content ID of the first game content. The selection unit 333 that selects the game content ID stored in the game content table T1 based on the identified identification information is an example of a first selection unit.

The selection unit 333 refers to the game content table T1, acquires the selection instruction from the progression processing unit 332, and then identifies the group to which the already selected game content belongs. The selection unit 333 determines whether the group other than the identified group is present in the game content table T1. For example, the selection unit 333 identifies the categories associated with the already selected game content from the game content table T1 and determines whether the categories other than the identified category are stored in the game content table T1.

When the selection unit 333 acquires the selection instruction from the progression processing unit 332 and determines that groups other than the group to which the already selected game content belongs is present, the selection unit 333 identifies a single group from among the groups. When the selection unit 333 determines that a group other than the group to which the already selected game content belongs is present, the selection unit 333 identifies the group from among the groups to which the already selected game content belongs. Next, the selection unit 333 extracts the game content included in the identified group from the game content table T1. The selection unit 333 selects a single game content from among the extracted game contents based on the attribute identified by the specification unit 334 described later. For example, the selection unit 333 extracts a single category in a predetermined order or at random from among categories other than the categories associated with the already selected game content. Next, the selection unit 333 extracts all or a part of the game content IDs associated with the extracted category from the game content table T1. The selection unit 333 extracts the game content ID associated with the attribute specified by the specification unit 334 from the extracted game contents IDs as the selection target and selects a game content ID from the extracted selection targets based on a predetermined selection method. The predetermined selection method is a random lottery method of randomly extracting a game content from the selection targets. The predetermined selection method may be a method of extracting a game content from the selection targets in a predetermined order. In this case, the predetermined order is the order of the game content ID, the order of the attribute of the game content (for example, degree of rarity, etc.), the order in which the game content is stored, etc. The selection unit 333 that selects a game content from the extracted game contents based on the identified attribute is an example of the second selection unit.

When the selection unit 333 acquires the selection instruction from the progression processing unit 332 and determines that a group other than the group to which the already selected game content belongs is not present, the selection unit 333 instructs the association unit 335 to execute the associating process of the selected game content.

The specification unit 334 refers to the game content table T1 to identify the attribute associated with the first game content. In other words, the specification unit 334 extracts the attribute associated with the game content ID identified based on the identification information included in the selection instruction from the game content table T1 by the selection unit 333 and identifies the attribute associated with the first game content.

The association unit 335, when the conduction of the associating process is instructed from the selection unit 333, associates all game contents selected by the selection unit 333 (game content group) with the identification information (for example, player ID) for identifying the player included in the selection instruction as the owning game content and stores the all game contents associated with the identification information in the player table T3.

The creation unit 336 refers to the game content table T1 and the player table T3 and creates the display data for displaying the result screen 410 at least including the image indicating each of the game contents included in the stored game content group. For example, the creation unit 336 arranges the image indicating each of the game content included in the game content group as the second result image group 412 in the result screen 410. The creation unit 336 identifies the game content ID of the avatar associated with the player in a predetermined order, randomly, or according to the instruction of the player, and acquires the image of the avatar associated with the identified game content ID from the server storage unit 32. The creation unit 336 synthesizes the acquired image of the avatar with at least one of the images indicating each of the game contents included in the game content group to generate the first result image 411 and arranges the generated first result image 411 to the result screen 410.

Figure 8:
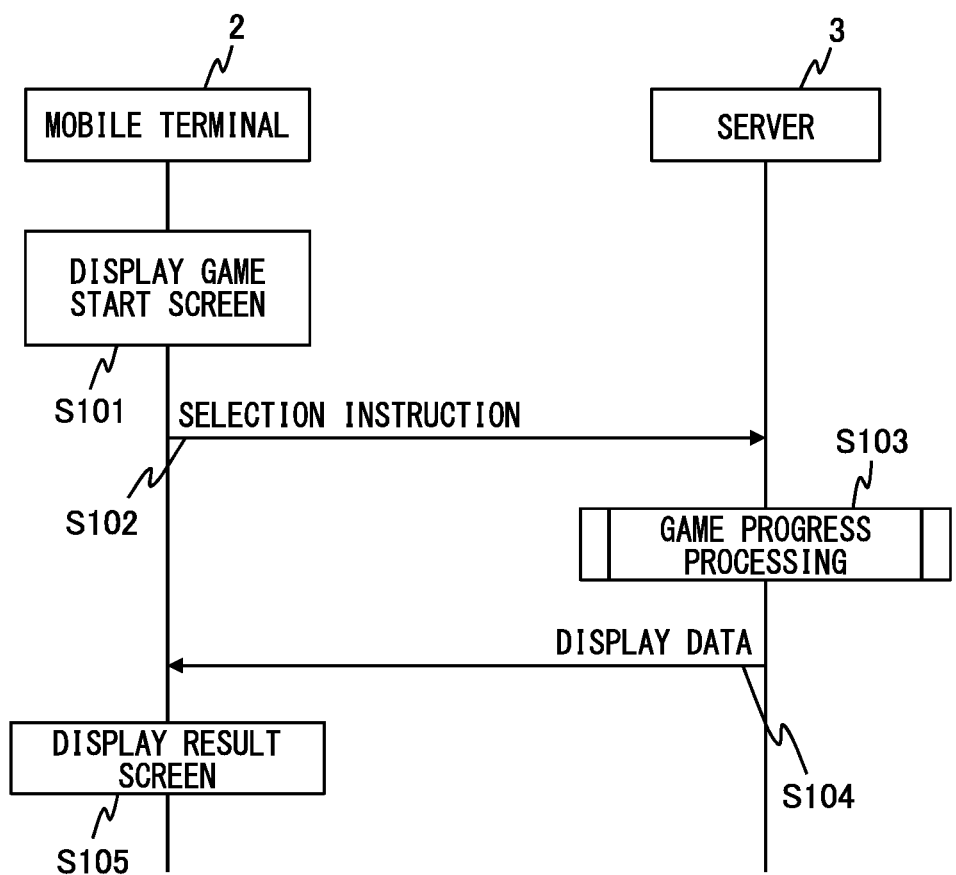
FIG. 8 is a sequence diagram illustrating one example of an operation sequence of the game system 1.

FIG. 8 is a sequence diagram illustrating one example of the operation sequence of the game system 1. The operation sequence is mainly executed by the terminal processing unit 25 and the server processing unit 33 in cooperation with each element of the mobile terminal 2 and the server 3 based on the program stored in the terminal storage unit 22 and the server storage unit 32 in advance.

The display processing unit 252 of the mobile terminal 2 displays the game start screen 400 on the display unit 24 (step S101). The game start screen 400 is displayed when, for example, the control program for executing the selection game in the present embodiment according to the operation of the operation unit 23 by the player is activated.

The terminal transmission/reception unit 251 of the mobile terminal 2 transmits the selection instruction input according to the operation of the operation unit 23 by the player to the server 3 via the terminal communication unit 21 (step S102).

The server transmission/reception unit 331 of the server 3 receives the selection instruction from the mobile terminal 2 via the server communication unit 31. The progression processing unit 332, the selection unit 333, the specification unit 334, the association unit 335, and the creation unit 336 of the server processing unit 33 execute the game progress processing based on the selection instruction received by the server transmission/reception unit 331 (step S103). Details of the game progress processing are described later.

The server transmission/reception unit 331 transmits the display data for displaying the result screen created by the game progress processing to the mobile terminal 2 via the server communication unit 31 (step S104).

The terminal transmission/reception unit 251 of the mobile terminal 2 receives the display data from the server 3 via the terminal communication unit 21. The display processing unit 252 displays the result screen 410 on the display unit 24 based on the display data received by the terminal transmission/reception unit 251 (step S105).

Figure 9:
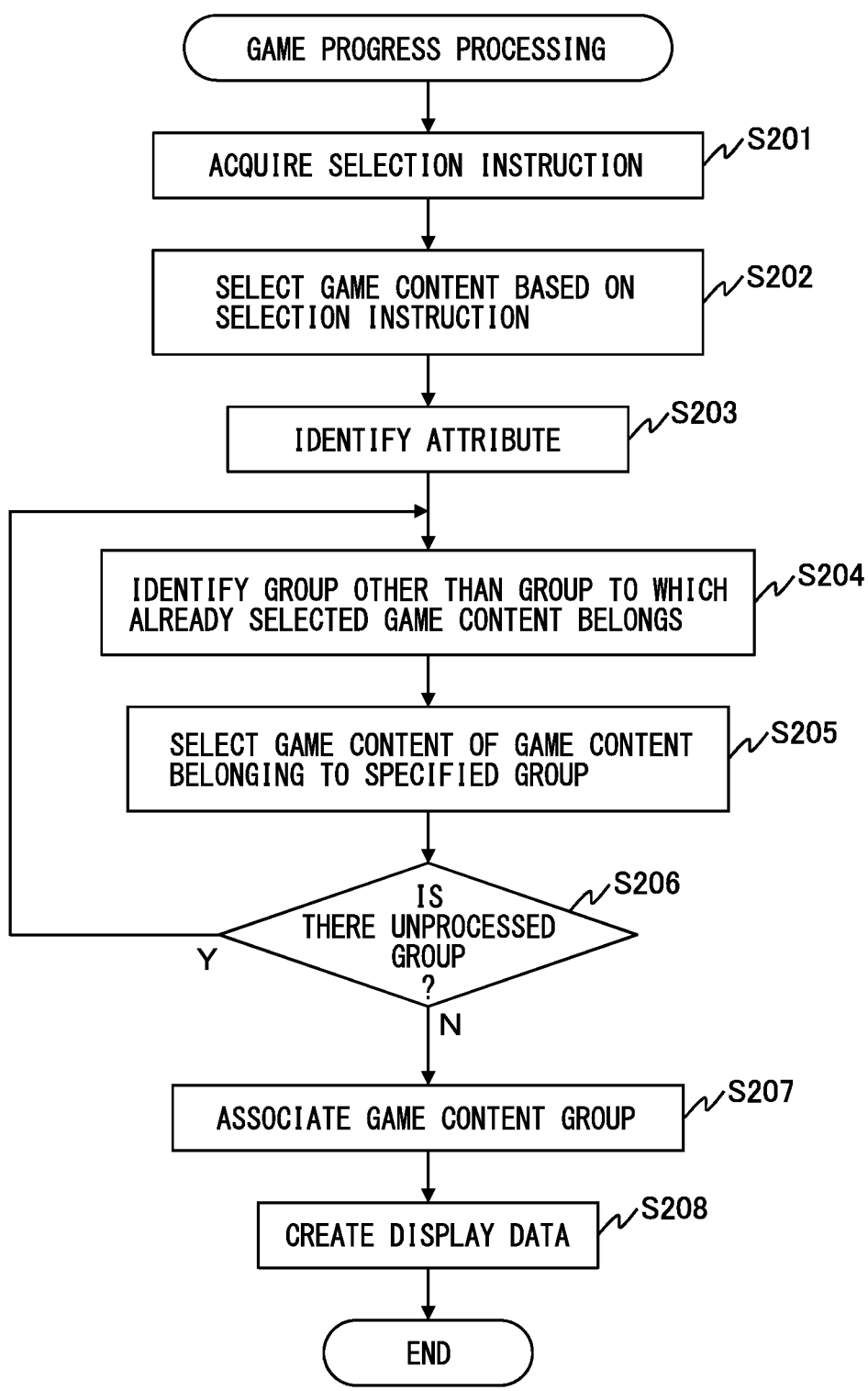
FIG. 9 is a flow diagram illustrating one example of an operation flow of game progress processing.

FIG. 9 illustrates one example of the operation flow of the game progress processing by the progression processing unit 332, the selection unit 333, the specification unit 334, the association unit 335, and the creation unit 336 of the server processing unit 33 of the server 3. The game progress processing illustrated in FIG. 9 is conducted at step S103 of FIG. 8.

The progression processing unit 332 acquires the selection instruction received by the server transmission/reception unit 331 (step S201).

The selection unit 333 identifies the identification information included in the acquired selection instruction for identifying the game content and selects the game content ID stored in the game content table T1 based on the identified information (step S202).

The specification unit 334 refers to the game content table T1 to identify the attribute associated with the selected game content ID (step S203).

The selection unit 333 identifies one group from the groups other than the group belonging to the already selected game content (step S204). The selection unit 333 extracts the game content included in the identified group from the game content table T1 and selects a game content from the extracted game contents based on the identified attribute (step S205).

The selection unit 333 refers to the game content table T1 and determines whether the group other than the groups to which the selected game content belongs is present (step S206).

When the selection unit 333 determines that the group other than the groups to which the selected game content belongs is present (step S206—Yes), the process is returned to step S204.

When the selection unit 333 determines that the group other than the groups to which the selected game content belongs is not present (step S206-No), the selection unit 333 instructs the association unit 335 to execute the associating process of the selected game content.

When the association unit 335 is instructed to execute the associating process from the selection unit 333, the association unit 335 stores all game contents (game content group) selected at steps S202 and S205 to the player table T3 as the owning game content (step S207).

Next, the creation unit 336 creates the display data for displaying the result screen 410 at least including the image indicating each of the game contents included in the game content group stored at step S207 (S208) and ends a series of steps.

In the game system according to the present embodiment, the game content group associated with the player includes the game content associated with the same attribute and the player can acquire the unified game content group. Accordingly, by the game system according to the present embodiment, it is possible to improve the motivation of the player to continue the game with respect to the game that relates a plurality of game contents to the player and increase the number of participants to the game. Further, in the game system according to the present embodiment, when the number of the second game content associated with the attribute is more than one, by one selection instruction, a plurality of second game contents are simultaneously associated with the player. As a result, compared with the game system in which the selection game is executed for each of a plurality of second game contents, the number of executions of the game execution process is reduced and the amount of data for displaying the user interface screen is reduced. Thus, by the game system according to the present embodiment, the load of the processing for progressing the selection game can be reduced. By the game system according to the present embodiment, it is possible to provide the user interface that does not demand the player to conduct a plurality of operations and can be easily operated by any player.

The present invention is not limited to the present embodiment. For example, the game start screen displayed when the control program for executing the selection game in the present embodiment is activated does not need to include the candidate game content 401 and the selection object 402.

Figures 10A, 10B:
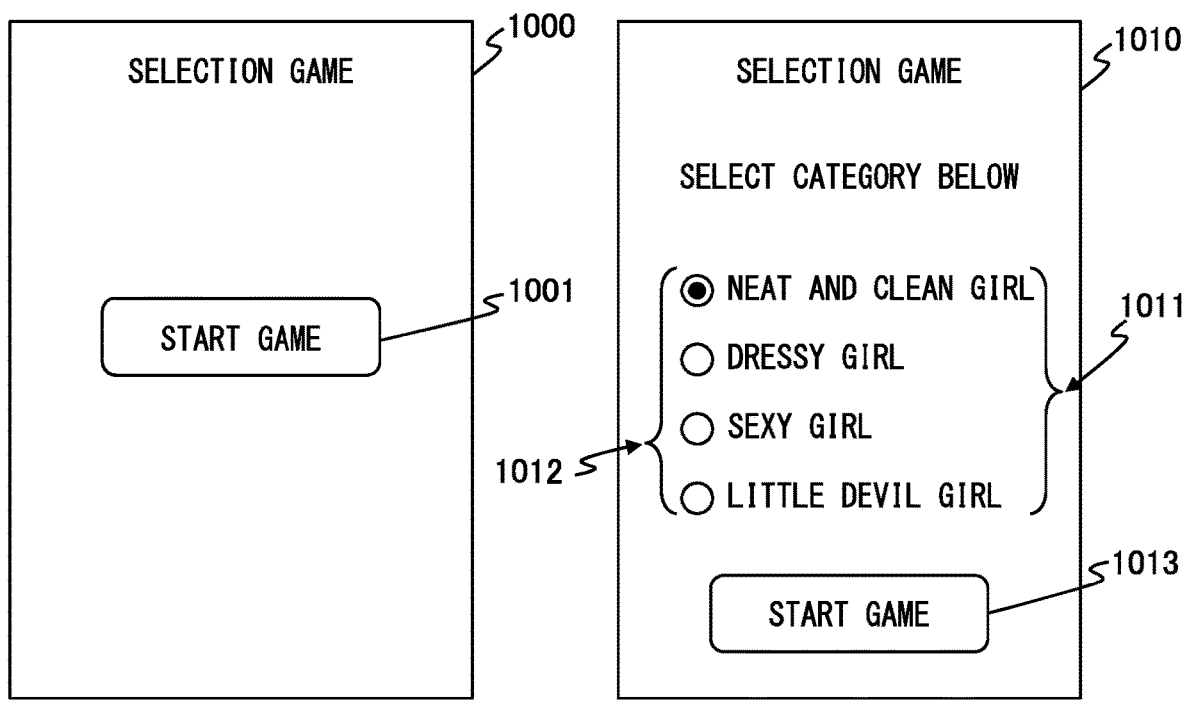
FIG. 10A and FIG. 10B are diagrams illustrating one example of screens displayed on the mobile terminal 2.

FIG. 10A is a diagram illustrating one example of the game start screen 1000 displayed to the display unit 24 of the mobile terminal 2 according to the variation. The game start screen 1000 includes a game start object 1001.

The game start object 1001 is the button object for instructing the selection game execution. The game start object 1001 may be the icon image, the text, etc. When the input position on the game start screen 1000 input according to the operation of the operation unit 23 by the player is within the display area of the game start object 1001, the selection instruction is input to the mobile terminal 2. In this way, when the player conducts the operation of selecting the game start object 1001, the selection instruction is input to the mobile terminal 2. When the player inputs the selection instruction, the selection game is executed and the result screen 410 is displayed to the display unit 24. The selection instruction includes the identification information for identifying the player.

The game start screen may include the attribute selection object for causing the player to select the attribute.

FIG. 10B is a diagram illustrating one example of the game start screen 1010 displayed to the display unit 24 of the mobile terminal 2 according to the variation. The game start screen 1010 includes a candidate attribute 1011, an attribute selection object 1012, and a game start object 1013.

The candidate attribute 1011 is the text indicating each of a plurality of attributes. The candidate attribute 1011 may be anything as long as the candidate attribute 1011 indicates the attribute and may be, for example, the icon image. The candidate attribute 1011 may be the image indicating the game content associated with the attribute.

For example, the candidate attribute 1011 indicating the attribute of the "neat and clean girl" is the text "neat and clean girl," the icon image indicating the "neat and clean girl", the image indicating the item of the "neat and clean girl" (an image associated with any one of the game content IDs among game content IDs associated with the attribute of the "neat and clean girl"), etc. For example, the candidate attribute 1011 indicating the attribute of the color of "red" is the text "red", the icon image of the red colors, the image indicating the item of the red color (an image associated with any one of the game content IDs among game content IDs associated with the attribute of the "red"), etc.

The attribute selection object 1012 is the selection object for selecting an attribute from the candidate attributes 1011 and is, for example, a check button. Each of the attribute selection objects 1012 corresponds one-to-one with each of the candidate attributes 1011. When the input position on the game start screen 1010 input according to the operation of the operation unit 23 by the player is within any one of the display area in the attribute selection object 1012, the attribute selection object 1012 corresponding to the display area is changed to the display indicating the selection by the player. In this way, when the player selects any one of the objects from among the attribute selection objects 1012, the selected attribute selection object 1012 is distinguishably displayed from other attribute selection objects 1012 which are not selected.

The game start object 1013 is the button object for instructing the selection game execution. The game start object 1013 may be the icon image, the text etc. When the input position on the game start screen 1010 input according to the operation of the operation unit 23 by the player is within the display area of the game start object 1013, the selection instruction is input to the mobile terminal 2. In this way, when the player selects the game start object 1013, the selection instruction is input to the mobile terminal 2. When the player inputs the selection instruction, the selection game is executed and the result screen 410 is displayed on the display unit 24.

The selection instruction includes the identification information for identifying the player and the information related to the attribute indicated by the candidate attribute 1011 corresponding to the attribute selection object 1012 selected by the player.

Figure 11:
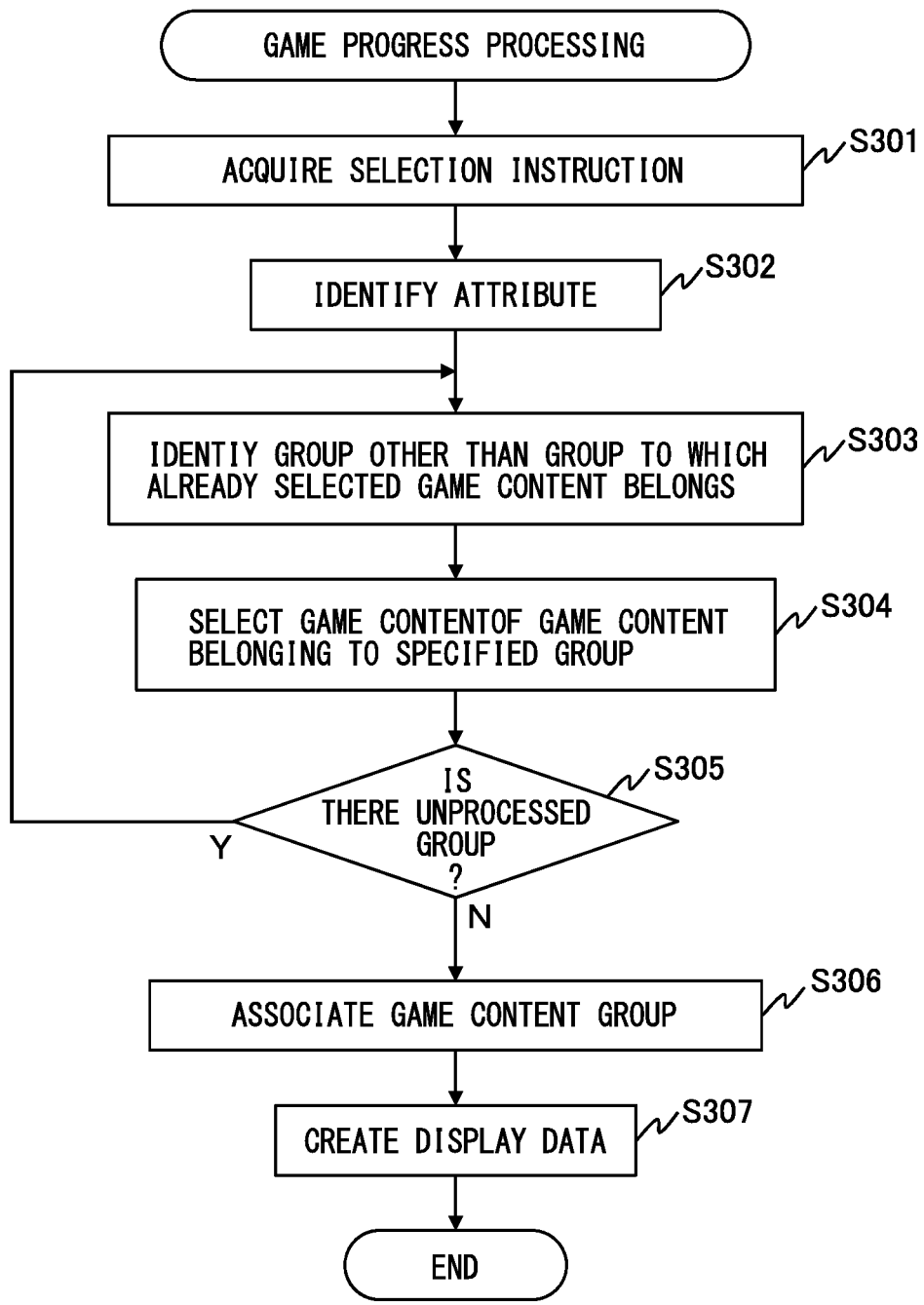
FIG. 11 is a flow diagram illustrating one example of the operation flow of the game progress processing.

FIG. 11 is a flow diagram illustrating one example of the operation flow of the game progress processing by the progression processing unit 332, the selection unit 333, the specification unit 334, the association unit 335, and the creation unit 336 when the selection instruction is input on the game start screen 1000 and the game start screen 1010. The game progress processing illustrated in FIG. 11 is executed at step S103 of FIG. 8.

The progression processing unit 332 acquires the selection instruction received by the server transmission/reception unit 331 (step S301).

The selection unit 333 identifies the attribute based on the acquired selection instruction (step S302). For example, when the acquired selection instruction includes the information associated with the attribute, the selection unit 333 identifies the attribute based on the information associated with the attribute. When the acquired selection instruction does not include the attribute, the selection unit 333 randomly selects an attribute from a plurality of attributes and identifies the selected attribute.

The selection unit 333 identifies one group from the groups other than the group belonging to the already selected game content (step S303). The selection unit 333 extracts the game content included in the identified group from the game content table T1 and selects a game content from the extracted game contents based on the identified attribute (step S304).

The selection unit 333 refers to the game content table T1 and determines whether the group other than the groups to which the selected game content belongs is present (step S305).

When the selection unit 333 determines that the group other than the groups to which the selected game content belongs is present (step S305—Yes), the process is returned to step S303. When the process is returned to step S303, the selection unit 333 may identify a new attribute instead of the attribute identified at step S302. In this case, at step S304 to be executed next, a game content is selected based on the newly identified attribute. In the identification processing of a new attribute, the selection unit 333 may identify the new attribute corresponding to the selection result executed immediately before. For example, the selection unit 333 newly identifies an attribute from the attributes associated with the game content selected immediately before in a predetermined order or at random. As a result, since each game content included in the game content group includes the attributes common to at least one of other game contents, the unified game content group can be associated with the player. Further, for example, the selection unit 333 may newly identify an attribute from the attributes other than the attributes associated with the game content selected immediately before in a predetermined order or at random. As a result, although it is possible that the sense of unity of the game content included in the game content group is weakened, the unexpected game content group can be associated with the player.

When the selection unit 333 determines that the group other than the groups to which the selected game content belongs is not present (step S305-No), the selection unit 333 instructs the association unit 335 to execute the associating process of the selected game content.

When the association unit 335 is instructed to execute the associating process from the selection unit 333, the association unit 335 stores all game contents (game content group) selected at steps S202 and S205 in the player table T3 as the owning game content (step S306).

The creation unit 336 creates display data for displaying the result screen 410 at least including the image indicating each of the game contents included in the game content group stored in step S207 (S307) and ends a series of steps.

In this way, the game system 1 can associate the game content group including a plurality of game contents with the player only by the player selecting the game start object 1001. By the mere selection of the desired attribute and the provision of the selection instruction by the player, the game system 1 can associate the game content group including a plurality of game contents associated with the attribute selected by the player with the player. As a result, the unified game content group is associated with the player and it is possible to improve the motivation of the player to continue the game with respect to the selection game and increase the number of participants to the game. In the game system according to the present embodiment, by one selection instruction, a plurality of game contents is simultaneously associated with the player. As a result, compared with the game system in which the selection game is executed for each of a plurality of game contents, the number of executions of the game execution process is reduced and the amount of data for displaying the user interface screen is reduced. Accordingly, by the game system according to the present embodiment, the load of the processing for progressing the selection game can be reduced. Further, by the game system according to the present embodiment, it is possible to provide the user interface that does not demand the player to conduct a plurality of operations and can be easily operated by any player.

After the game content group selected by the selection unit 333 is associated with the player, the association unit 335 of the server 3 may execute the exchange processing for exchanging the game content included in the game content group based on the instruction of the player.

In this case, for example, the game start screens 400, 1000, 1010, etc., include an instruction object (not illustrated). The instruction object is a button object for displaying a game content group display screen including the image indicating the game content included in the game content group associated with the player. The instruction object may be the icon image, the text, etc. When the input position on the game start screens 400, 1000, and 1010 input according to the operation of the operation unit 23 by the player is within the display area of the instruction object, a screen display instruction is input to the mobile terminal 2. In this way, when the player selects the instruction object, the screen display instruction is input to the mobile terminal 2. When the player inputs the screen display instruction, the game content group display screen is displayed to the display unit 24. The input of the screen display instruction by the player may be controlled to be executable only in the predetermined input possible period. The input possible period is, for example, either one of or both of the event period of the selection game and the predetermined period (or example, two days) after the end of the event period.

When the screen display instruction is input by the player, the terminal transmission/reception unit 251 of the mobile terminal 2 transmits the screen display instruction including the player ID of the player to the server 3 via the terminal communication unit 21. When the server transmission/reception unit 331 of the server 3 receives the screen display instruction from the mobile terminal 2 via the server communication unit 31, the association unit 335 extracts the owning game content associated with the player ID included in the screen display instruction from the player table T3.

When the owning game content includes each game content ID and the date and time when each game content is associated with the player, the association unit 335 may extract only the owning game content (the game content associated with the owner ID) associated with the player within the predetermined period from the date and time when the screen display instruction is input. As a result, the exchange processing can be executed only for the predetermined period from when the game content group is stored in association with the player.

The creation unit 336 refers to the game content table T1, extracts the image associated with each game content ID of the owning game content extracted by the association unit 335 and creates the display data for displaying the game content group display screen including the extracted image. The server transmission/reception unit 331 transmits the created display data to the mobile terminal 2 via the server communication unit 31.

The display processing unit 252 of the mobile terminal 2 acquires the display data received by the terminal transmission/reception unit 251 from the terminal transmission/reception unit 251 and displays the game content group display screen to the display unit 24 based on the acquired display data.

On the game content group display screen, the image indicating each game content included in the game content group stored in association with the player is displayed in a selectable manner. From among images indicating the game content displayed on the game content group display screen, the game content corresponding to the image specified according to the operation of the operation unit 23 by the player is identified as the exchange game content. The terminal transmission/reception unit 251 of the mobile terminal 2 transmits the exchange request including the identification information for identifying the identified exchange game content (game content ID, etc.) to the server 3 via the terminal communication unit 21.

When the server transmission/reception unit 331 of the server 3 receives the exchange request from the mobile terminal 2 via the server communication unit 31, the association unit 335 extracts the identification information of the exchange game content included in the exchange request. The association unit 335 identifies, from the game content table T1, the same game content ID as the extracted identification information, and extracts the category and the attribute associated with the identified game content ID. The association unit 335 selects a game content ID as the game content ID of the reselection game content based on the predetermined selection method from other game content IDs different from the identification information of the exchange game content associated with the extracted category and the attribute.

The association unit 335 exchanges the game content ID of the exchange game content among the owning game content associated with the player for the game content ID of the reselection game content in the player table T3 and stores the exchanged player table T3 to the server storage unit 32. The server transmission/reception unit 331 may transmit display data for displaying the screens including an image indicating either one of or both of the exchanged exchange game content and the reselection game content and the information indicating the content of the exchange to the mobile terminal 2. As a result, the player of the mobile terminal 2 can confirm the content of the exchange.

The association unit 335 may exchange the exchange game content of a first player among a plurality of players for the exchange game content of the second player among a plurality of players. For example, when the server transmission/reception unit 331 of the server 3 receives the exchange request from each of a plurality of mobile terminals 2 via the server communication unit 31, the association unit 335 extracts the identification information of the exchange game content included in each exchange request. The association unit 335 exchanges the pieces of identification information of the two exchange game contents satisfying a predetermined condition from among the extracted pieces of identification information of each exchange game content, and stores the exchanged identification information of the exchange game content to the player table T3. The two exchange game contents to be exchanged is the exchange game content of the first player and the exchange game content of the second player. The predetermined condition is, for example, a condition in which both the date and time of the reception of the exchange request by the first player and the date and time of the reception of the exchange request by the second player are within the predetermined period (for example, within 2 days), a condition in which the first player and the second player have a predetermined relationship, etc. As a result, the player can exchange the game content associated with the player (for example, first player) for the game content included in the game content group of another player (for example, second player). Therefore, among the game content groups acquired by the selection game execution, since the game content which the player does not want can be exchanged, it becomes possible to improve the motivation of the player to participate in the selection game.

When the specific game content is included in the game content groups stored in association with the player, the association unit 335 may give the reward to the player. In this case, the server storage unit 32 stores the game content ID of the specific game content. For example, the association unit 335 compares the game content ID of the game content included in the game content group stored in association with the player with the game content ID of the specific game content stored in the server storage unit 32. When the game content related to the same game content ID as the game content ID of the specific game content stored in the server storage unit 32 is included in the game content groups stored in association with the player, the association unit 335 gives the reward to the player.

The reward is to, for example, associate the game content group selected by the automatically executed selection game with the player. The selection game to be executed automatically selects the game content associated with the same category as the categories associated with the specific game content as the selection target. The selection game to be executed automatically may select the game content associated with the same attribute as the attribute associated with the specific game content as the selection target. The selection game to be executed automatically may select the game content that is associated with the same category as the categories associated with the specific game content and associated with the same attribute as the attribute associated with the specific game content as the selection target.

The reward may be the association of the avatar with the player, the execution right of the selection game, etc.

In the game progress processing, when the number of groups to which the already selected game content belongs reaches the number of predetermined groups, the selection unit 333 may instruct the association unit 335 to execute the associating process of the game content. For example, from the game content table T1, the selection unit 333 identifies the categories associated with the already selected game content and counts the number of identified categories. When the counted number reaches the number of predetermined categories, the selection unit 333 instructs the association unit 335 to execute the associating process.

In this case, the categories associated with the game content to be selected in the selection game may be determined based on the categories associated with the owning game content of the player. For example, the selection unit 333 refers to the game content table T1 and the player table T3, counts the number of the owning game contents of the player associated with each category for each category, and determines the order of each category in an ascending order of number.

The selection unit 333 extracts all or a part of the game content IDs associated with the first category in the determined order. From the extracted game contents IDs, the selection unit 333 extracts the game content ID associated with the attribute specified by the specification unit 334 as the selection target and selects a game content ID from the extracted selection targets based on the predetermined selection method.

The selection unit 333 extracts all or a part of the game content IDs associated with the second category in the determined order. From the extracted game contents IDs, the selection unit 333 extracts the game content ID associated with the attribute specified by the specification unit 334 as the selection target and selects a game content ID from the extracted selection targets based on the predetermined selection method.

The selection unit 333 executes the above described selection process until the order of the number of predetermined categories. For example, when the number of predetermined categories is five, the selection unit 333 further extracts all or a part of the game content IDs associated with third, fourth, fifth categories in the determined order and executes the above described selection process for each of the IDs.

As a result, in the selection game, it is possible to preferentially associate the game content of the group that the player does not possess with the player.

The processing of determining the categories associated with the game content to be selected based on the categories associated with the owning game content of the player may be executed only when the number of times the player participates in the selection game is equal to or less than a predetermined number of times. The processing of determining the categories associated with the game content to be selected based on the categories associated with the owning game content of the player may be executed only for a predetermined period after the player participates in the selection game for the first time. As a result, it becomes possible to preferentially associate the player who has just started the selection game (i.e., player who does not own game content rather than skilled person) with the game content of the group which is insufficient for the player. In this way, by the game system according to this embodiment, it is possible to improve the motivation of such novice player to continuously participate in the selection game.

Each function of the above described server processing unit 33 may be conducted by the terminal processing unit 25 of the mobile terminal 2. In this case, if various tables are stored in the terminal storage unit 22, it is not needed to conduct the communication with the server 3 for each processing, and it is possible to realize the above described function only with the mobile terminal 2. The game executed in the mobile terminal 2 may be a hybrid game in which each of the server 3 and the mobile terminal 2 plays a part of the processing. In that case, for example, provided are a web display in which each game screen related to the game progress is displayed on the mobile terminal 2 based on the display data generated by the server 3 and a native display in which other menu screens, etc., are displayed by the native application installed in the mobile terminal 2.

For example, the terminal storage unit 22 stores the game content ID of the avatar associated with the player and the image of the avatar associated with the game content ID. The display processing unit 252 of the mobile terminal 2 synthesizes at least one of the respective images of the second result image group 412 included in the display data received by the terminal transmission/reception unit 251 with the image of the avatar stored in the terminal storage unit 22. The display processing unit 252 arranges the synthesized image in the result screen 410 as the first result image 411 and displays the result screen 410 to the display unit 24. As a result, the processing load of the server processing unit 33 can be reduced.

The game system 1 may include only the plurality of mobile terminals 2 operated by each of the plurality of players. Each of a plurality of mobile terminals 2 performs the wireless communication with another mobile terminal 2 by a wireless communication scheme based on the IEEE 802.11 standard and an ad-hoc network is configured from a plurality of mobile terminals 2. In this case, the specific mobile terminal 2 among a plurality of mobile terminals 2 functions as a host and conducts each function of the above described server 3. The mobile terminal 2 other than the specific mobile terminal 2 among a plurality of mobile terminals 2 communicates with the specific mobile terminal 2 that conducts each function of the server 3 so that the above described game is conducted. The specific mobile terminal 2 functioning as the host conducts both each function of the server 3 and each function of the mobile terminal 2.

A person skilled in the art should understand that various changes, substitutions and modifications can be added thereto without departing from the spirit and scope of the present invention.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A computer for executing progress of a game by using a game content, the computer comprising:
   memory configured to store information corresponding to each of a plurality of game contents classified into a plurality of groups associated with an attribute; and
   circuitry configured to
     select a first game content from among game contents belonging to a first group among the plurality of groups in response to receiving a selection instruction from a player;
     identify an attribute associated with the selected first game content;
     select, after identifying the attribute associated with the selected first game content selected in response to receiving the selection instruction from the player, a second game content from among game contents belonging to a second group of the plurality of groups based on the identified attribute, without receiving another selection instruction from the player; and
     associate a game content group at least including the selected first game content and the selected second game content with a player and store the resultant game content group to the memory.

2. The computer according to claim 1, wherein
the circuitry is configured to
   receive an instruction corresponding to an exchange game content from a player with respect to the game content group;
   select a reselection game content from among other game contents belonging to a group to which the exchange game content belongs; and
   exchange the reselection game content for the exchange game content.

3. The computer according to claim 2, wherein
the memory is configured to store information indicating whether players include a predetermined relationship;
the circuitry is configured to
   receive an instruction corresponding to the exchange game content with respect to the game content group of each of a first player and a second player from each of the first player and the second player; and
   exchange an exchange game content specified by the first player for an exchange game content specified by the second player.

4. The computer according to claim 2, wherein
the circuitry is configured to exchange the exchange game content for a predetermined period from when the game content group is associated with the player and the game content group associated with the player is stored in the memory.

5. The computer according to claim 1, wherein
the memory is configured to store an avatar indicating a player in various services provided by the computer; and
the plurality of game contents includes an item attached to the avatar.

6. The computer according to claim 5, wherein
the circuitry is configured to output an image of the avatar attached with the item included in the game content group.

7. A control method for controlling a computer for executing progress of a game by using a game content, the computer including a memory, the control method comprising:
   storing, in the memory, information corresponding to each of a plurality of game contents classified into a plurality of groups associated with an attribute;
   selecting a first game content from among game contents belonging to a first group among a plurality of groups in response to receiving a selection instruction from a player;
   identifying an attribute associated with the selected first game content;
   selecting, after identifying the attribute associated with the selected first game content selected in response to receiving the selection instruction from the player, a second game content from among game contents belonging to a second group of the plurality of groups based on the identified attribute, without receiving another selection instruction from the player; and associating a game content group at least including the selected first game content and the selected second game content with a player and storing the resultant game content group to the memory.

8. A non-transitory computer-readable medium including computer program instructions, when executed by a computer for executing progress of a game by using a game content, the computer including a memory, the computer program instructions causing the computer to:
   store, in the memory, information corresponding to each of a plurality of game contents classified into a plurality of groups associated with an attribute;
   select a first game content from among game contents belonging to a first group among a plurality of groups in response to receiving a selection instruction from a player;
   identify an attribute associated with the selected first game content;
   select, after identifying the attribute associated with the selected first game content selected in response to receiving the selection instruction from the player, a second game content from among game contents belonging to a second group of the plurality of groups based on the identified attribute, without receiving another selection instruction from the player; and
   associate a game content group at least including the selected first game content and the selected second game content with a player and store the resultant game content group to the memory.

9. A terminal device for executing progress of a game by using a game content, the terminal device comprising:
   memory configured to store information corresponding to each of a plurality of game contents classified into a plurality of groups associated with an attribute;
   circuitry configured to
      select a first game content from among game contents belonging to a first group among the plurality of groups in response to receiving a selection instruction from a player;
      identify an attribute associated with the selected first game content;
      select, after identifying the attribute associated with the selected first game content selected in response to receiving the selection instruction from the player, a second game content from among game contents belonging to a second group of the plurality of groups based on the identified attribute, without receiving another selection instruction from the player; and
      associate a game content group at least including the selected first game content and the selected second game content with a player and store the resultant game content group to the memory.

* * * * *